(12) United States Patent
Perry

(10) Patent No.: US 9,275,530 B1
(45) Date of Patent: Mar. 1, 2016

(54) SECURE AREA AND SENSITIVE MATERIAL TRACKING AND STATE MONITORING

(71) Applicant: The Boeing Company, Seal Beach, CA (US)

(72) Inventor: Steven R. Perry, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/738,045

(22) Filed: Jan. 10, 2013

(51) Int. Cl.
*G08B 13/14* (2006.01)
*G08B 13/24* (2006.01)

(52) U.S. Cl.
CPC .................................. *G08B 13/2462* (2013.01)

(58) Field of Classification Search
CPC ........... G06Q 20/3674; G08B 13/2462; G08B 13/248; G08B 13/242; G08B 13/2402; G08B 21/22; G08B 25/14; G06K 2017/0045; E05G 1/10
USPC ............. 340/572.1–572.9, 571, 568.1–568.8, 340/570, 500, 502, 504, 505, 521, 522, 528, 340/825.31, 825.32, 825.34
See application file for complete search history.

(56) References Cited

U.S. PATENT DOCUMENTS

| | | | | |
|---|---|---|---|---|
| 5,886,634 | A * | 3/1999 | Muhme | 340/572.1 |
| 5,920,261 | A * | 7/1999 | Hughes et al. | 340/568.8 |
| 6,492,905 | B2 * | 12/2002 | Mathias et al. | 340/540 |
| RE38,702 | E * | 2/2005 | Clement et al. | 340/572.4 |
| 7,551,086 | B2 | 6/2009 | Coop et al. | |
| 7,688,208 | B2 * | 3/2010 | Schuler et al. | 340/572.1 |
| 7,859,725 | B2 * | 12/2010 | Troyansky et al. | 358/3.28 |
| 7,982,601 | B2 * | 7/2011 | Corrado et al. | 340/539.22 |
| 8,004,387 | B2 * | 8/2011 | Childress et al. | 340/5.92 |
| 8,190,304 | B2 | 5/2012 | Feuillebois et al. | |
| 2002/0158761 | A1 * | 10/2002 | Runyon et al. | 340/572.1 |
| 2007/0241908 | A1 | 10/2007 | Coop | |
| 2009/0040025 | A1 * | 2/2009 | Volpi et al. | 340/10.1 |
| 2010/0090829 | A1 | 4/2010 | Pujol | |
| 2011/0241838 | A1 * | 10/2011 | Wischmeyer | 340/10.1 |
| 2011/0309910 | A1 * | 12/2011 | Lee | 340/5.52 |

* cited by examiner

*Primary Examiner* — Kerri McNally
(74) *Attorney, Agent, or Firm* — Armstrong Teasdale LLP

(57) ABSTRACT

In one aspect, a system for monitoring an area containing sensitive material is provided. The system includes at least one radio frequency identification (RFID) tag for coupling to an object and a reading and warning system including an RFID tag reader operable to receive a signal from the at least one RFID tag. The reading and warning system provides a warning when the at least one RFID tag is coupled to the object and the RFID tag reader receives a signal from the at least one RFID tag, and the object is one of a sensitive material and a prohibited material.

18 Claims, 2 Drawing Sheets

SECURE AREA AND SENSITIVE MATERIAL TRACKING AND STATE MONITORING

BACKGROUND OF THE DISCLOSURE

The field of the disclosure relates generally to radio frequency identification (RFID) systems, and more particularly, to systems and methods utilizing RFID tags to track and monitor sensitive material.

Many private, governmental and military installations include "secure" or "closed" areas that have restricted access. Such secure areas often contain sensitive materials (e.g., classified documents, computers, media, etc.) that are prohibited from leaving the area. Similarly, some materials such as cell phones, cameras, memory sticks, media, etc. are prohibited from entering these secure areas. However, despite the best precautions, individuals entering or exiting such secure areas may inadvertently transfer such materials or items from or into such areas. Such violations result in serious impacts on operations, unauthorized classified data transfer, and/or interruptions in the ability to perform required functions. Furthermore, such violations may require costly post-violation investigation and security costs.

Sensitive materials may also be located in or on vulnerable targets, such as embassies, aircraft, ships and unmanned systems. In some routine or emergency situations (e.g., information disposal, downed aircraft, etc.), such sensitive materials must be visually located and manually destroyed to prevent their use or exploitation by enemies or unauthorized persons. However, in some situations, it is difficult to visually identify, to locate and/or to neutralize sensitive materials or systems in a timely manner. As such, a need exists in the art for a system to track and monitor areas containing sensitive materials.

BRIEF DESCRIPTION OF THE DISCLOSURE

In one aspect, a system for monitoring an area containing sensitive material is provided. The system includes at least one radio frequency identification (RFID) tag for coupling to an object and a reading and warning system including an RFID tag reader operable to receive a signal from the at least one RFID tag. The reading and warning system provides a warning when the at least one RFID tag is coupled to the object and the RFID tag reader receives a signal from the at least one RFID tag, and the object is at least one of a sensitive material or a prohibited material.

In another aspect, a method of monitoring an area containing sensitive material is provided. The method includes providing at least one radio frequency identification (RFID) tag and coupling the at least one RFID tag to an object, wherein the object is at least one of a sensitive material or a prohibited material. The method further includes providing a reading and warning system having an RFID tag reader, receiving a signal from the at least one RFID tag with the reading and warning system, and providing a warning when the signal from the at least one RFID tag is received.

In yet another aspect, a method of monitoring and neutralizing sensitive material is provided. The method includes providing at least one radio frequency identification (RFID) tag and coupling the at least one RFID tag to the sensitive material such that the RFID tag changes state when the sensitive material is neutralized, and providing an RFID tag reader. The method further includes receiving a signal from the at least one RFID tag with the RFID tag reader, identifying and/or locating the sensitive materials based on the signal received from the RFID tag reader, and determining if the object is neutralized based on at least one of: receiving an altered signal from the at least one RFID tag when the RFID tag changes state, or not receiving a signal from the at least one RFID tag when the RFID tag changes state.

DETAILED DESCRIPTION OF THE DISCLOSURE

Figure 1:
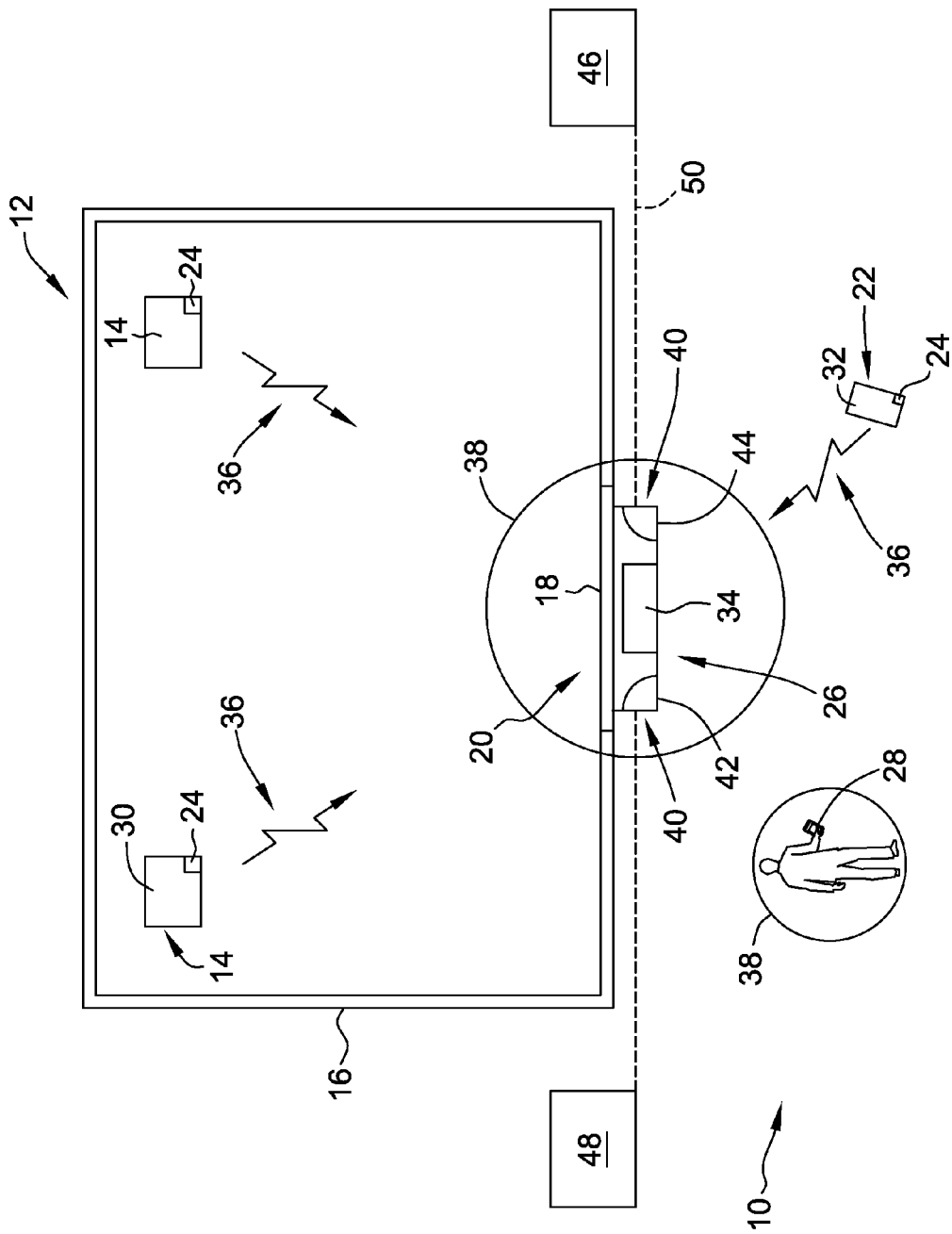
FIG. 1 is a schematic illustration of an exemplary secure area and sensitive material monitoring system implemented in a secure area.

Radio frequency identification (RFID) is a technology that enables a wide range of objects to be identified, tracked and managed. RFID technology is based on the use of small radio tags or transponders and readers/encoders for connection to an information system. RFID tags, which contain a unique code together with other additional information, can be read by a reader/encoder from a distance without contact or line-of-sight. Typically, RFID are categorized as either active or passive.

Active RFID tags are often powered by an internal battery and may include read/write functionality (i.e., tag data can be rewritten and/or modified). An active RFID tag's memory size may vary according to application requirements. In a typical active RFID system, the RFID tag may periodically transmit its data, including a part number and location to a central tracking database. The battery-supplied power of an active tag generally gives it a longer read range than a passive RFID tag.

Passive RFID tags operate without an internal power source, and rather obtain operating power from the electromagnetic transmissions generated by the reader. Consequently, passive tags may be much lighter than active tags, be less expensive, and offer a virtually unlimited operational lifetime. Passive tags are typically read-only and are programmed with a unique set of data that cannot be modified. However, some passive tags may also be read/write tags that are initially programmed with a unique set of data, and as such, data on the tags may be modified and updated at desired intervals. In order to operate, the passive tag reader must initiate communication to the tag, and wait for the tag to respond with its identifier. Typically, to obtain the location of the passive tag, the reader may use a combination of the previous known location of the tag, received signal strength indicators (RSSI), and the time distance of arrival (TDOA) between the tag and reader, i.e., a triangulation antenna gain measurement. Thus, locating passive RFID tags is generally more accurate as compared to active tags. Although cheaper and smaller than active tags, passive tags have shorter read ranges than active tags and require a higher-powered reader.

A basic RFID system generally consists of three components: an antenna or coil, a transceiver (with decoder), and a transponder (RF tag) electronically programmed with unique information. Often the antenna is packaged with the transceiver and decoder to become a reader or interrogator that is configurable as either a handheld or a fixed-mount device. The reader emits radio or magnetic waves in ranges of anywhere from one inch to 100 feet or more, depending upon its power output and the radio frequency used. When a RFID tag is within the electromagnetic zone of a transceiver, it detects the reader's activation signal. The electromagnetic field activates the RFID tag (transponder) attached to and associated with an object. In response, the RFID tag transmits an identifier code to the reader to indicate the presence of the object to which it is coupled. Because of the characteristics of electromagnetic energy, a direct line of sight between the reader and the RFID tag is not necessary. The reader, which acts as a transceiver, decodes the data encoded in the tag's integrated circuit (typically a silicon chip) and the data is passed to a host computer for processing. The reader/encoder may also write data to the RFID tag.

One advantage of RFID systems is the non-contact, non-line-of-sight nature of the technology. Tags can be read through a variety of substances, including metal, where barcodes or other, traditional optically read technologies would be impractical. RFID tags are available in a wide variety of shapes and sizes, and tags can be configured as small as possible.

In one aspect, the RFID tag includes software embedded therein which causes the RFID tags to recognize and to respond only to authorized inquiry and update requests. Additionally, RFID tag ID's and digital serial numbers may be encoded and encrypted to prevent inadvertent tracking and monitoring by others. In another aspect, the RFID tag includes software embedded therein that causes the RFID tags to format and process information for storage and retrieval purposes. Additionally, the RFID tag may include a processing device and non-volatile storage sufficient to store the codes and information used to process the legitimate and authorized requests directed to it from an RFID query/update device.

With respect to authorized inquiry and update requests, the non-volatile storage in certain embodiments of the RFID tag includes software that enables the RFID tag to only respond to received messages that include, for example, a specific authorization code. In these aspects of RFID tags, the software may be further configured such that only received messages in a specific data format will be recognized by the RFID tags. In a particular aspect, the data format includes one or more defined data fields within the message, one or more of which may be read-only fields.

Such messages may also include one or more command codes that specify what type of message (i.e., inquiry, data update, reconfiguration of RFID tag) is being received by the RFID tag. In a particular aspect, the authorization codes are user selectable. Having user selectable authorization codes provides a mechanism such that multiple users cannot inadvertently receive data from, or accidentally reconfigure, RFID tags belonging to another entity. In these aspects, the data format may be the same for all users.

The present disclosure describes systems and methods for identifying, monitoring, tracking, and determining the status of sensitive materials utilizing radio frequency identification (RFID) technology described herein.

FIG. 1 illustrates an exemplary secure area and sensitive material monitoring system 10 designed to operate in a controlled or secure area 12 that contains sensitive materials 14. Secure area 12 may be, for example, a laboratory, a storage facility, a military installation, an aircraft, etc., and sensitive materials 14 may include classified documents, computers, hard-drives, media etc. In the exemplary aspect, secure area 12 includes walls 16, a door 18 and a doorway 20. In some situations, it may be necessary to prohibit sensitive materials 14 from leaving secure area 12, and to prohibit foreign materials 22 (e.g., cameras, cell phones, pagers, etc.) from entering secure area 12. System 10 tracks materials 14 and 22 and warns personnel of potential security violations prior to entering or exiting secure area 12.

System 10 includes one or more RFID tag 24, and at least one reading and warning system 26 that may be built into structures such as walls 16, door 18 or doorway 20, or alternatively, removably coupled to such structures. For example, reading and warning system 26 may be located immediately inside and/or outside door 18 of secure area 12, or between a double door entry area (not shown). Alternatively, reading and warning system 26 may be incorporated into a hand-held scanning device 28. Individual RFID tags 24 are coupled to sensitive materials 14 such as a laptop 30 and to foreign materials 22 such as a cell phone 32. As illustrated, sensitive materials 14 are located inside secure area 12, and prohibited foreign materials 22 are located outside secure area 12. Reading and warning system 26 includes an RFID tag reader 34 that reads a signal 36 produced by RFID tag 24. Reading and warning system 26 facilitates automatic identification, classification, and inventory of sensitive materials 14 and foreign materials 22 that include RFID tag 24, based on signals 36 received from RFID tags 24 coupled to materials 14 and 22.

In the exemplary implementation, reading and warning system 26 has an established activation zone or proximity 38 and one or more warning device 40 such as an audible warning device 42 and/or a visual warning device 44. When RFID tag 24 enters proximity 38, reading and warning system 26 detects signal 36 and indicates that sensitive material 14 and/or foreign material 22 is imminently exiting or entering secure area 12. Warning device 40 provides a warning to an individual transporting sensitive material 14 and/or foreign material 22 that a security violation is about to occur. For example, audible warning device 42 may provide an audible warning such as an alarm or a recorded voice that notifies or alerts an individual. Similarly, visual warning device 44 may provide a visual warning such as a flashing light to notify the individual of an impending security violation. Additionally, reading and warning system 26 may deny access to or from secure area 12 when RFID tag 24 is within proximity 38 (e.g., by automatically locking door 18). Reading and warning system 26 may also be communicatively coupled to a security station 46 and a computer 48. As such, reading and warning system 26 may transmit a signal 50 to security station 46 if a violation has occurred or is about to occur, for example, to notify security personnel. Reading and warning system 26 may also track the movement of RFID tags 24, inventory RFID tags 24, and log such details within reading and warning system 26 and/or computer 48. Reading and warning system 26, hand-held device 28 and/or computer 48 may be connected to a network and/or database (not shown) to monitor and inventory RFID tags 24. In addition to tracking, reading and warning system 26 may activate a camera, a microphone, or other sensor (not shown) to record details of RFID tag transport events that may subsequently be stored by computer 48, a database, or other storage device.

In use, secure area and sensitive material monitoring system 10 is installed in or around secure area 12. RFID tags 24 are coupled to sensitive materials 14 located within secure area 12 and/or to foreign materials 22 that are prohibited within secure area 12. Reading and warning system 26 is preferably located at an entry/exit point of secure area 12, such as in doorway 20. RFID tag reader 34 receives signals 36 from RFID tags 24 and reading and warning system 26 can identify, inventory and log sensitive materials 14 and/or foreign materials 22 to monitor or otherwise keep track of materials 14 and/or 22. If RFID tags 24 come within predefined proximity 38, reading and warning system 26 activates warning device 40 to alert an individual that materials 14 and/or 22 are prohibited from entering or exiting secure area 12. As such, warning device 40 issues a warning or alarm to prevent a security violation. Additionally, reading and warning system 26, 28 may alert security station 46 of a transfer or possible transfer of materials 14 and/or 22 into or out of secure area 12. Alerted security personnel may then prevent a security violation and quickly address the situation. Reading and warning system 26, 28 may also send information to computer 48 corresponding to type, classification, location and movement of materials 14 and/or 22 within secure area 12 or between multiple secure areas 12 to monitor and track such information.

Figure 2:
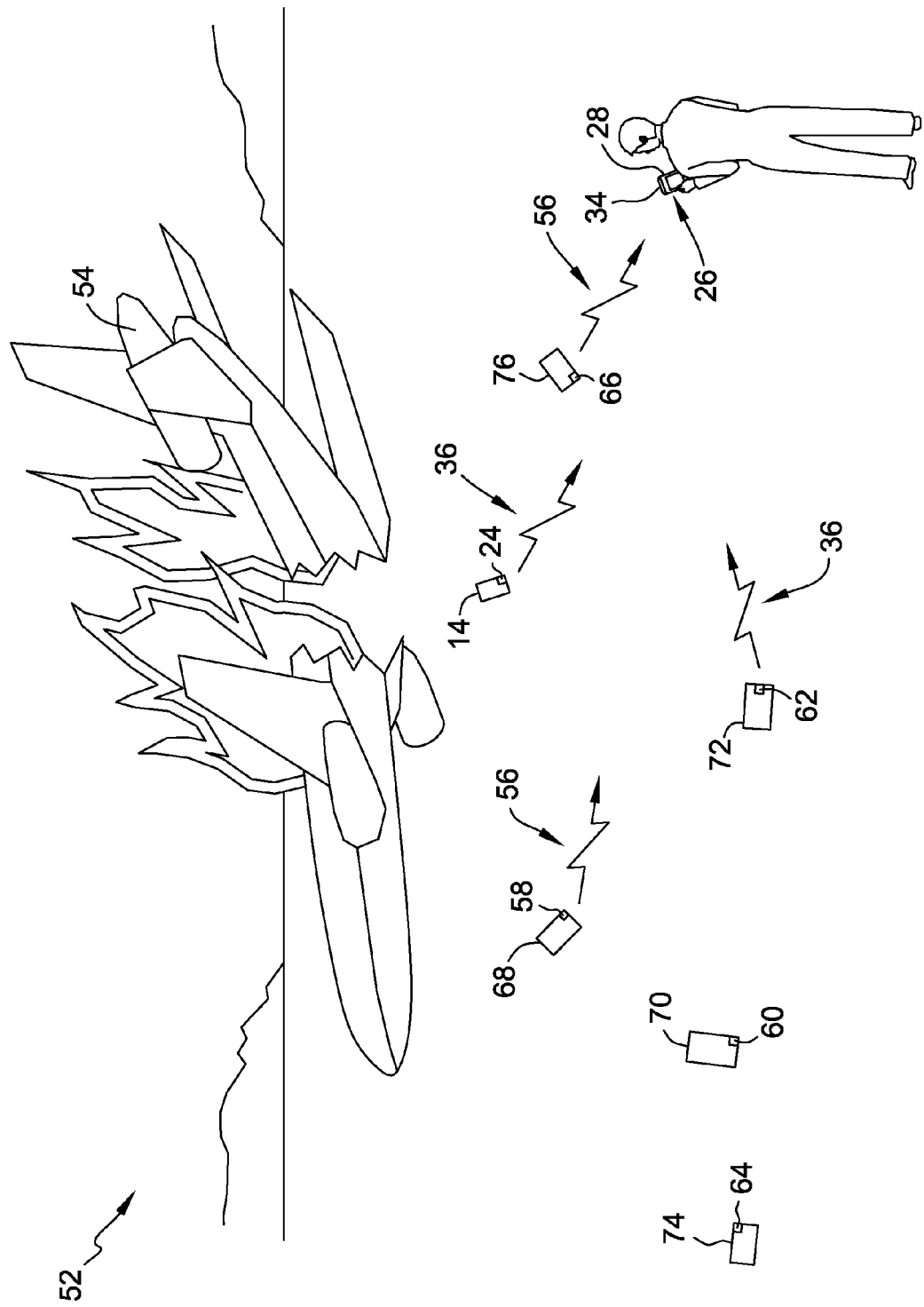
FIG. 2 is a schematic illustration of the system shown in FIG. 1 and implemented at a wreckage site.

FIG. 2 illustrates secure area and sensitive material monitoring system 10 implemented in a sanitation situation. Such situations may arise when sensitive material 14 is at risk of being compromised by an enemy or of an unauthorized capture (i.e., an embassy attack, a downed aircraft, etc.). In some such situations, it is desirable, especially in foreign countries, to "neutralize" sensitive material 14. As defined herein, the term "neutralize" means to destroy, sanitize, or otherwise render an object or information inoperable, unusable, ineffective and/or unidentifiable such that the object or information cannot be obtained, read and/or used. Conventional procedures for neutralizing sensitive materials are through visual identification by way of reading labels and/or part numbers affixed to the materials. The problem with such conventional procedures is that reading labels and/or part numbers is a time-consuming and/or difficult process in time-sensitive situations, adverse weather conditions, darkness, crowded or cramped spaces, etc. Moreover, sanitation personnel may need to manually account for, locate, and neutralize a multitude of sensitive materials, before such materials could be possessed by unauthorized personnel. However, such short time frames and enhanced pressure may result in possible errors in neutralizing all of the sensitive material and/or may waste critical time in locating sensitive material that has already been neutralized (e.g., during a plane crash). In such situations, system 10 is utilized to identify, locate and determine the status of sensitive material 14.

In the exemplary implementation, secure area 12 is a wreckage site 52 of a downed aircraft 54 and includes RFID tags 24 coupled to sensitive material 14 located in or around aircraft 54. Alternatively, secure area 12 can be a site of a disabled or abandoned system, a compromised facility, or the like. Reading and warning system 26 may be a hand-held device 28 located on aircraft 54 or transported to wreckage site 52 by a downed aircraft recovery team. RFID tag reader 34 of reading and warning system 26 receives signals 36 from RFID tags 24 and provides a list of sensitive materials 14 to be neutralized. Reading and warning system 26 may also assist a user in locating sensitive materials 14 located throughout wreckage site 52.

In the exemplary implementation, reading and warning system 26 is also capable of determining the status of materials 14 (e.g., neutralized or not neutralized) by communicating with reactive RFID tags 24. In the exemplary implementation, RFID tags 24 that are reactive to predetermined conditions are operably coupled to materials 14. At least a portion of reactive RFID tags 24 are designed to fail and/or to change state when subjected to various conditions, such as magnetic, thermal, electrical, chemical and/or physical stimuli that are sufficient to neutralize sensitive material 14. For example, failed and/or altered state RFID tags 24 may cease to provide signal 36 and/or may provide an altered signal 56 to indicate to reading and warning system 26, 28 that sensitive material 14 is sufficiently neutralized. As such, in some implementations, RFID tag 24 may be a magnetically-reactive RFID tag 58, a thermally-reactive RFID tag 60, a chemically-reactive RFID tag 62, an electrically-reactive RFID tag 64 and/or a physically-reactive RFID tag 66.

In the exemplary implementation, a magnetically-reactive RFID tag 58 is coupled to a sensitive material 68 that fails or that is neutralized when subjected to a magnetic field (e.g., a hard drive). When sensitive material 68 is subjected to a magnetic field sufficient to neutralize the material, magnetically-reactive RFID tag 58 ceases to provide signal 36 and/or provides altered signal 56 to RFID tag reader 34 that indicates to reading and warning system 26, 28 that sensitive material 68 is neutralized.

Thermally-reactive RFID tag 60 may be coupled to a sensitive material 70 that fails or that is neutralized when subjected to a thermal condition (e.g., an instruction manual that is burned). When sensitive material 70 is subjected to a thermal condition sufficient to neutralize the material, thermally-reactive RFID tag 60 ceases to provide signal 36 and/or provides altered signal 56 to RFID tag reader 34 that indicates to reading and warning system 26, 28 that sensitive material 70 is neutralized.

In the exemplary implementation, chemically-reactive RFID tag 62 may be coupled to a sensitive material 72 that fails or that is neutralized when it comes into contact with a chemical or composition (e.g., an object that is neutralized in the atmosphere or in water). When sensitive material 72 is subjected to a chemical condition sufficient to neutralize the material, chemically-reactive RFID tag 62 ceases to provide signal 36 and/or provides altered signal 56 to RFID tag reader 34 that indicates to reading and warning system 26, 28 that sensitive material 72 is neutralized.

Electrically-reactive RFID tag 64 may be operably coupled to a sensitive material 74 that fails or that is neutralized when it is receives a high current or overvoltage (e.g., tag 64 is electrically coupled to a circuit, antenna, microprocessor, etc.) When sensitive material 74 is subjected to an electrical condition sufficient to neutralize the material, electrically-reactive RFID tag 64 ceases to provide signal 36 and/or provides altered signal 56 to RFID tag reader 34 that indicates to reading and warning system 26, 28 that sensitive material 74 is neutralized.

Physically-reactive RFID tag 66 may be coupled to a sensitive material 76 that fails or that is neutralized when it is physically manipulated (e.g., classified documents put through a shredder). When sensitive material 76 is subjected to a physical manipulation sufficient to neutralize the material, physically-reactive RFID tag 64 ceases to provide signal 36 and/or provides altered signal 56 to RFID tag reader 34 that indicates to reading and warning system 26, 28 that sensitive material 76 is neutralized.

In use during a sanitation situation, such as with downed aircraft 54, reading and warning system 26 is activated. In some implementations, system 26 is automatically activated based on the occurrence of a predetermined event (e.g., a plane crash, a security breach, a remote signal, etc.). For example, hand-held device 28 is transported to wreckage site 52 and activated. Hand-held device 28 includes RFID tag reader 34, which receives signals 36 and/or altered signals 56 from RFID tags 24, 58, 60, 62, 64 and/or 66 that are coupled to sensitive materials 14, 68, 70, 72, 74 and/or 76. Device 28 quickly identifies, classifies, and inventories all sensitive materials 14 based on received signals 36 and/or altered signals 56. If signal 36 is received, device 28 provides a warning or indication that there is remaining sensitive material 14, 68, 70, 72, 74 and/or 76 that needs to be neutralized, and device 28 may assist a user in locating the non-neutralized sensitive material 14 within site 52. Once sensitive material 14 is neutralized, RFID tags 24, 58, 60, 62, 64 and/or 66 do not emit signal 36 and/or emit altered signal 56, and device 28 provides a warning or indication that sensitive material 14, 68,

70, 72, 74 and/or 76 associated with a particular RFID tag 24, 58, 60, 62, 64 and/or 66 has been neutralized. As such, reading and warning system 26, 28 provides verification of natural and/or controlled destruction of sensitive materials 14, 68, 70, 72, 74 and/or 76.

In the event that sensitive material 14, 68, 70, 72, 74 and/or 76 is compromised, secure area and sensitive material monitoring system 10 may be used to clandestinely monitor and track sensitive material 14, 68, 70, 72, 74 and/or 76. For example, a high-powered reading and warning system 26 located remotely or on a deployed unmanned system may geolocate, identify and/or track signal 36 and/or 56 depending on the specific tag sophistication and power level of RFID tag 24, 58, 60, 62, 64 and/or 66.

As described herein, secure area and sensitive material monitoring system provides systems and methods to track and monitor sensitive materials within secure areas and/or during sanitation situations. The systems warn individuals of inadvertent transport of prohibited materials into and out of secure areas, lower security violation rates, and facilitate reducing or eliminating costly post-violation investigations and security costs. Moreover, the systems track sensitive materials and provide a record of the movement of such materials. Further, the systems use condition reactive RFID tags that are coupled to sensitive materials and that fail or change state in response to a certain stimulus, which verifies destruction or neutralization of sensitive materials. As such, the systems enable sanitation teams to quickly find, identify, classify, assess, inventory, recover and/or destroy sensitive material such that it cannot be used or exploited by unauthorized persons.

Though computer 48 has been discussed herein, computer 48 may instead be, for example, one or more reduced instruction set circuits (RISC), one or more application specific integrated circuits (ASICs), one or more logic circuits, and/or any other circuit or processor capable of executing the functions described herein. Further, references to memory in this specification may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

When introducing elements of the present invention or the implementation(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

This written description uses examples to disclose the implementations, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for monitoring an area containing sensitive material, said system comprising:
   an object comprising sensitive material, wherein said object is reactive to a predetermined condition, wherein subjection to the predetermined condition neutralizes said sensitive material;
   at least one radio frequency identification (RFID) tag coupled to said object and configured to change state when subjected to the predetermined condition;
   a reading and warning system comprising an RFID tag reader operable to receive a signal from said at least one RFID tag, wherein said reading and warning system provides a warning when said at least one RFID tag is coupled to said object and said RFID tag reader receives a signal from said at least one RFID tag, and
   wherein said reading and warning system is configured to determine when the object is neutralized based on at least one of: receiving an altered signal from said at least one RFID tag when said RFID tag changes state, or receiving no signal from said at least one RFID tag when said RFID tag changes state.

2. The system of claim 1, wherein said reading and warning system provides the warning when said at least one RFID tag is within a predefined proximity to at least one of said reading and warning system or said RFID tag reader.

3. The system of claim 1, wherein said reading and warning system provides the warning when the object attempts to enter the area.

4. The system of claim 1, wherein said reading and warning system provides the warning with at least one of an auditory warning or a visual warning.

5. The system of claim 1, wherein said reading and warning system provides the warning to a security station to alert security personnel.

6. The system of claim 1, wherein said reading and warning system is configured to at least one of identify, classify or inventory the object based on the signal received from said at least one RFID tag.

7. The system of claim 1, wherein said reading and warning system is configured to monitor at least one of the movement of the object into at least one predefined secure area or the movement of the object out of the at least one predefined secure area.

8. The system of claim 1, wherein the predetermined condition comprises at least one of a predefined physical, a predefined thermal, a predefined electrical and a predefined chemical stimuli sufficient to neutralize said object.

9. The system of claim 1, wherein the predetermined condition comprises a predefined magnetic stimulus sufficient to neutralize the object.

10. A method of monitoring an area containing sensitive material, the method comprising:
    coupling a radio frequency identification (RFID) tag to an object comprising a sensitive material reactive to a predetermined condition, whereupon the sensitive material is neutralized and the RFID tag changes state;
    receiving a signal from the RFID tag using a reading and warning system comprising a RFID tag reader;
    providing a warning when the signal from the RFID tag is received by the reading and warning system; and
    determining, with the reading and warning system, if the object is neutralized based on at least one of: receiving an altered signal from the RFID tag when the RFID tag changes state, or not receiving a signal from the RFID tag when the RFID tag changes state.

11. The method of claim 10, wherein said providing a warning comprises providing a warning when at least one of: the object attempts to exit a predefined secure area or the object attempts to enter a predefined secure area.

12. The method of claim 10, wherein said providing a warning comprises providing a warning when the RFID tag is within a predefined proximity to at least one of the reading and warning system or the RFID tag reader.

13. The method of claim 10, wherein said providing a warning further comprises providing at least one of an auditory or a visual warning when the signal from the RFID tag is received.

14. The method of claim 10, further comprising at least one of identifying, classifying, or inventorying the object based on the signal received from the RFID tag.

15. The method of claim 10, further comprising monitoring at least one of the movement of the object into a predefined secure area or the movement of the object out of a predefined secure area, based on the signal received from the RFID tag.

16. A method of monitoring and neutralizing sensitive material, the method comprising:
    providing at least one radio frequency identification (RFID) tag;
    coupling the at least one RFID tag to the sensitive material such that the RFID tag changes state upon exposure to a predetermined condition, wherein the sensitive material is reactive to and neutralized upon subjection to the predetermined condition;
    providing an RFID tag reader;
    receiving a signal from the at least one RFID tag with the RFID tag reader;
    identifying and/or locating the sensitive material based on the signal received from the RFID tag reader; and
    determining if the sensitive material is neutralized based on at least one of: receiving an altered signal from the at least one RFID tag when the RFID tag changes state, or not receiving a signal from the at least one RFID tag when the RFID tag changes state.

17. The system of claim 1, wherein said RFID tag reader is further configured to provide a list of sensitive materials to be neutralized based on at least the signal received from said at least one RFID tag.

18. The system of claim 1, wherein said reading and warning system further comprises at least one sensor configured to record details regarding transportation of said at least one RFID tag, said at least one sensor comprising at least one of a camera and a microphone.

* * * * *